(No Model.) 2 Sheets—Sheet 1.
T. W. GENTRY & G. W. O'BRIEN.
HEATING, SETTING, AND REMOVING TIRES.
No. 357,194. Patented Feb. 8, 1887.
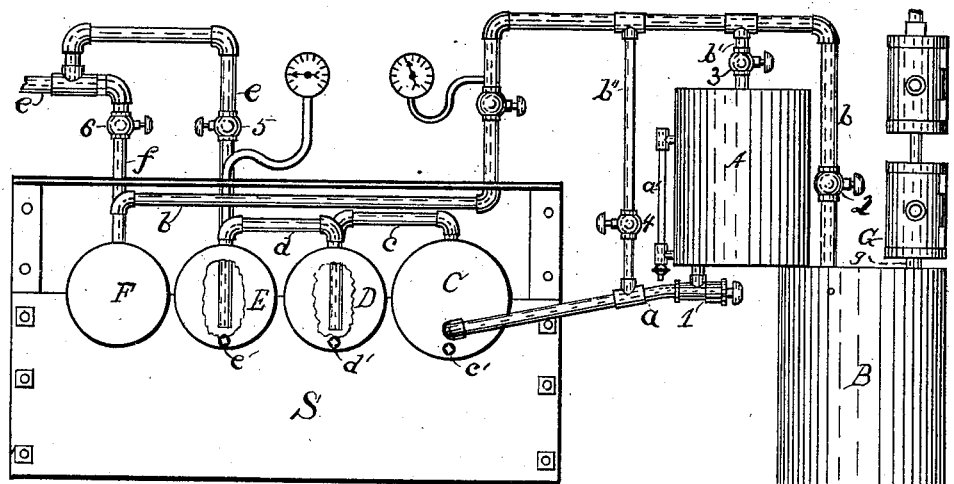
Fig. I
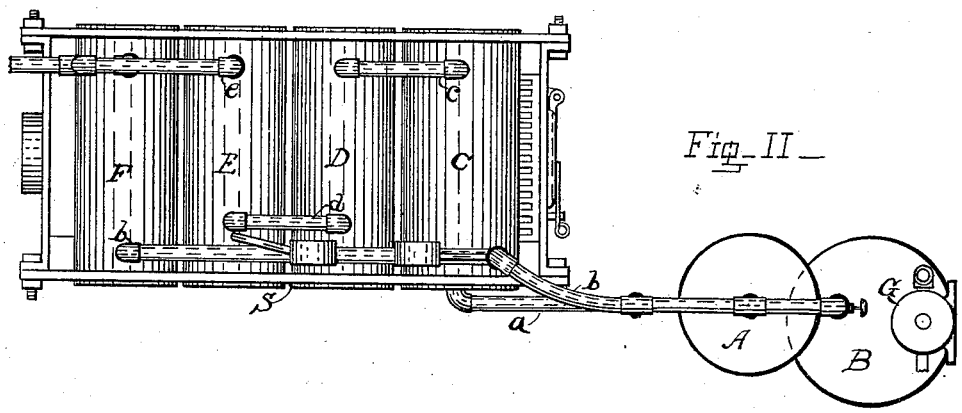
Fig. II
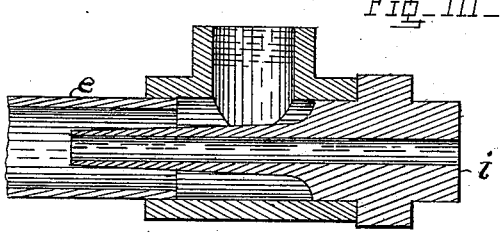
Fig. III
Witnesses—
Geo. K. Pettis
Ned P. Wood.
Inventors—
Thomas W. Gentry
George W. O'Brien
By Albert A. Wood Att'y (No Model.) 2 Sheets—Sheet 2.
T. W. GENTRY & G. W. O'BRIEN.
HEATING, SETTING, AND REMOVING TIRES.
No. 357,194. Patented Feb. 8, 1887.
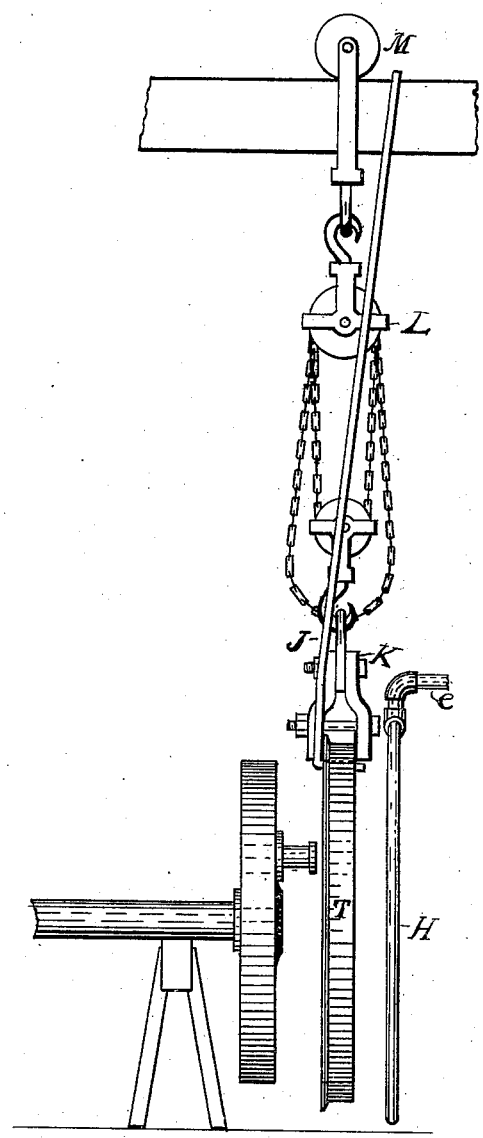
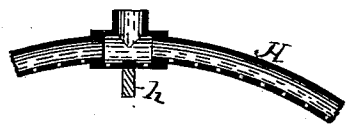
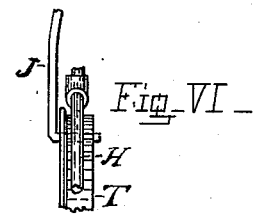
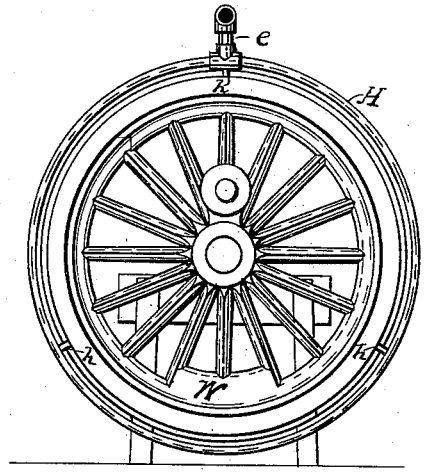

UNITED STATES PATENT OFFICE.

THOMAS W. GENTRY AND GEORGE W. O'BRIEN, OF ATLANTA, GEORGIA.

HEATING, SETTING, AND REMOVING TIRES.

SPECIFICATION forming part of Letters Patent No. 357,194, dated February 8, 1887.

Application filed June 2, 1886. Serial No. 203,962. (No model.)

*To all whom it may concern:*

Be it known that we, THOMAS W. GENTRY and GEORGE W. O'BRIEN, citizens of the United States of America, residing at Atlanta, in the county of Fulton and State of Georgia, have invented certain new and useful Improvements in Apparatus for Setting and Removing Tires; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of this invention is to produce a more convenient system for setting and removing locomotive-tires; and it consists in the use of hydrocarbon gas and the means for producing the same from petroleum oil, and mechanism for handling the tires, as will be hereinafter fully set forth.

In the accompanying drawings, Figure I is a side view, and Fig. II is a plan, for the plant for the production of the gas, showing the furnace with the retort, superheaters, and air-heater, the oil-tank, air-pump, gages, and the necessary pipes and valves. Fig. III is an enlarged longitudinal sectional view of the air-injector. Fig. IV is a view of the means by which the tire is handled when hot. Fig. V shows a wheel with the hoop gas-burner in position for heating the tire for removal. The position of the hoop gas-burner would be the same if the tire were being heated to be set. Fig. VI is an edge view of a portion of the tire and hoop and the hook by which it is suspended. Fig. VII is a section through the hoop gas-burner, showing the holes through which the gas escapes.

In these figures, A represents an oil-tank provided with a glass gage, $a'$, to show the depth of the oil in the tank; B, an air-drum; C, a retort; D and E, superheaters, and F an air-heating drum.

G is an air-forcing pump.

Connections are made between the above different parts by the air-conducting pipes $g\,b$ $b'\,b''$, the oil-conducting pipe $a$, and the vapor-pipes $c$ and $d$. The pipes $a$, $b$, $b'$, and $b''$ are provided with valves 1, 2, 3, and 4.

S is a furnace, preferably of cast-iron, lined with bricks and provided with suitable grate, doors, and chimney-connection, and having circular openings through its sides to receive the retort and superheaters and allow the exposure of their ends in order that the residuum may be removed through the plugged holes $c'\,d'\,e'$.

The pipe $e$ conducts the gas from the superheater E to the pipe-hoop H. At a convenient angle of the pipe $e$ the pipe $f$ from the air-heating drum is joined, the air being introduced into the pipe through a tube, $i$, Fig. III, extending beyond the turn and a considerable distance into the pipe $e$. The flow of gas and air through the pipes $e$ and $f$ is regulated by the valves 5 and 6.

W is a wheel and tire, preferably in an upright position, and supported on trestles or otherwise raised from the floor sufficiently to let the hoop gas-burner H pass under. This hoop has on its inner side studs $h$, of such a length as coming in contact with the tire will adjust it to a uniform distance from the tire. The pipe-hoop is at short intervals on its inner side perforated with small holes, as shown in Fig. VII, to allow the gas to escape and burn in jets, the blaze being thrown by pressure on the burning gas in the direction of the tire.

On the hook J, depending from an overhead support, is hung the tire, which, being heated before being placed on the wheel, is preferably pushed out of the hoop before being taken hold of with the clamp K, as shown in Fig. IV, in order to obviate the necessity of disconnecting the piping. The clamp K is carried by a hoisting-tackle, L, by which the tire may be raised off the hook J and be adjusted to a proper height to pass when in an expanded condition over the wheel, the hoisting-tackle being suspended from the wheel M on an overhead beam or track, on which it will roll as required in moving the tire to the wheel.

The oil from the tank passes through the pipe $a$, and is discharged into the retort, where it is volatilized, whence it passes through the superheaters to the pipe $e$. The pipes are placed in the retorts, superheaters, and air-heaters in such a way that the outlets will be in the ends opposite the inlets, as shown in Fig. II, and those entering the superheaters will extend nearly to their bottoms for the purpose of circulating the gas over the hottest part of the surperheaters.

It is obvious if the oil flowed from the tank by its own gravity only that its flow, being in proportion to its depth, would need constant regulation, and that the gas, by reason of its pressure and being lighter than the oil, would escape through the oil. It is therefore found to be advantageous to supply a pressure to the top of the oil by air from a forcing-pump, which, to insure a more uniform pressure, is passed through a holder, B. This pressure of air also serves to neutralize the varying effects of the different depths of oil on the discharge, and enables it to discharge through a smaller aperture. It is found to have a beneficial effect to introduce the proper proportion of air into the retort, which, for convenience, is introduced with the oil and is regulated by the valve 4. As the oil flows very slowly from the tank, the valve $l$ should be of a kind that can be adjusted very accurately; but as an excessive pressure of gas would impede the flow and make it self-regulating to a sufficient extent for all practical purposes, it is sufficient to have the valve so set as to discharge fast enough for the supply of the greatest amount of gas required, as the pressure of gas cannot more than equal the air-pressure added to the gravity-pressure of the oil in the tank without stopping the flow of oil.

It is found to be desirable to introduce and mix hot air with the gas near the point at which the gas is burned, which is best accomplished by the arrangement of pipes in Fig. III, as it produces the desired pressure at the burner without increasing it in the retort or superheaters.

It is sometimes found to be convenient to heat the tires on locomotives for the purpose of removal or shimming without removing the wheels from the locomotive, in which case the locomotive is jacked up to the height that will allow the hoop gas-burner to be put around the wheels, and if the gas-plant is a movable one—for instance, placed on a car to be run to a position on either side of the locomotive—the air-brake pump and drum on the locomotive may be utilized to furnish the air-pressure in place of the pump G and drum B, the pump G being the only part requiring power and inconvenient to move.

Having thus described our invention, we claim as new and desire to secure by Letters Patent—

1. In an apparatus for setting and removing tires, the hoop gas-burner H, having studs $h$, and a pipe connection with a gas-generator, in combination with a hook, J, to support the tire, and the clamp K, adjustable in height by a hoisting-tackle carried by a roller, M, substantially as shown, and for the purpose specified.

2. A plant for heating, setting, and removing tires, consisting of an oil-tank, a retort, superheater, air force-pump, air-heater, hot-air injector, the conducting-pipes and the valves, and the furnace with the hoop gas-burner surrounding the tire, the supporting-hook, and hoisting-tackle, substantially as shown and described.

In testimony whereof we affix our signatures in presence of two witnesses.

THOMAS W. GENTRY.
GEORGE W. O'BRIEN.

Witnesses:
JOHN J. WOODSIDE,
J. C. MANLY.